(12) United States Patent
Krall et al.

(10) Patent No.: US 11,525,715 B2
(45) Date of Patent: Dec. 13, 2022

(54) LINEARIZATION OF INPUT SIGNALS

(71) Applicant: Infineon Technologies AG, Neubiberg (DE)

(72) Inventors: Christoph Krall, Sankt Veit an der Glan (AT); Stefan Lanschuetzer, St. Margarethen (AT); Sebastian Uitz, Villach (AT)

(73) Assignee: Infineon Technologies AG, Neubiberg (DE)

( * ) Notice: Subject to any disclaimer, the term of this patent is extended or adjusted under 35 U.S.C. 154(b) by 170 days.

(21) Appl. No.: 16/851,338

(22) Filed: Apr. 17, 2020

(65) Prior Publication Data

US 2020/0333169 A1 Oct. 22, 2020

(30) Foreign Application Priority Data

Apr. 18, 2019 (DE) .......................... 102019205679.2

(51) Int. Cl.
    *G01D 18/00* (2006.01)
    *G01D 5/12* (2006.01)

(52) U.S. Cl.
    CPC .............. *G01D 18/00* (2013.01); *G01D 5/12* (2013.01)

(58) Field of Classification Search
    CPC ................................. G01D 18/00; G01D 5/12
    See application file for complete search history.

(56) References Cited

U.S. PATENT DOCUMENTS

| | | | | |
|---|---|---|---|---|
| 5,274,577 A | * | 12/1993 | Hinrichs | G01R 19/25 708/290 |
| 2002/0011837 A1 | * | 1/2002 | Sato | G01D 5/145 324/207.2 |
| 2011/0248705 A1 | | 10/2011 | Matsumoto et al. | |
| 2013/0027028 A1 | | 1/2013 | Hohe et al. | |
| 2013/0088219 A1 | * | 4/2013 | Fox | G01B 7/003 324/207.11 |
| 2014/0239942 A1 | | 8/2014 | Schaaf | |
| 2020/0142010 A1 | * | 5/2020 | Chowdhury | G01R 33/10 |

FOREIGN PATENT DOCUMENTS

| | | |
|---|---|---|
| DE | 102009001614 A1 | 9/2010 |
| WO | 2009041251 A1 | 4/2009 |

* cited by examiner

*Primary Examiner* — Natalie Huls
*Assistant Examiner* — Michael J Singletary
(74) *Attorney, Agent, or Firm* — Harrity & Harrity, LLP

(57) ABSTRACT

An apparatus for linearizing an input signal includes a memory, in which an output value is stored for each of a plurality of linearization points. The linearization points divide a value range into a plurality of intervals. Each interval is delimited by a first linearization point with an assigned first output value and a second linearization point with an assigned second output value. The apparatus includes a computer device configured to determine the interval in which an input signal value of the input signal is located and to calculate a linearized output signal value for the input signal value by way of a linear interpolation using the input signal value, the first output value of this interval, and the second output value of this interval. At least two of the intervals have different interval lengths, which are formed by multiplication of an output interval length by an integer factor.

20 Claims, 11 Drawing Sheets

200 — Determining the interval of a value range in which an input signal value of an input signal is located, wherein the value range is divided into a plurality of intervals by linearization points, wherein each interval is delimited by a first linearization point with an assigned first output value and a second linearization point with an assigned second output value, at least two of the intervals have different interval lengths, which are formed by multiplication of an initial interval length by an integer factor, wherein the factor of at least one of the intervals is not an integer power of an integer base of two or more 202 — Calculating a linearized output signal value for the input signal value by linear interpolation using the input signal value, the first output value of this interval and the second output value of this interval

FIG. 7

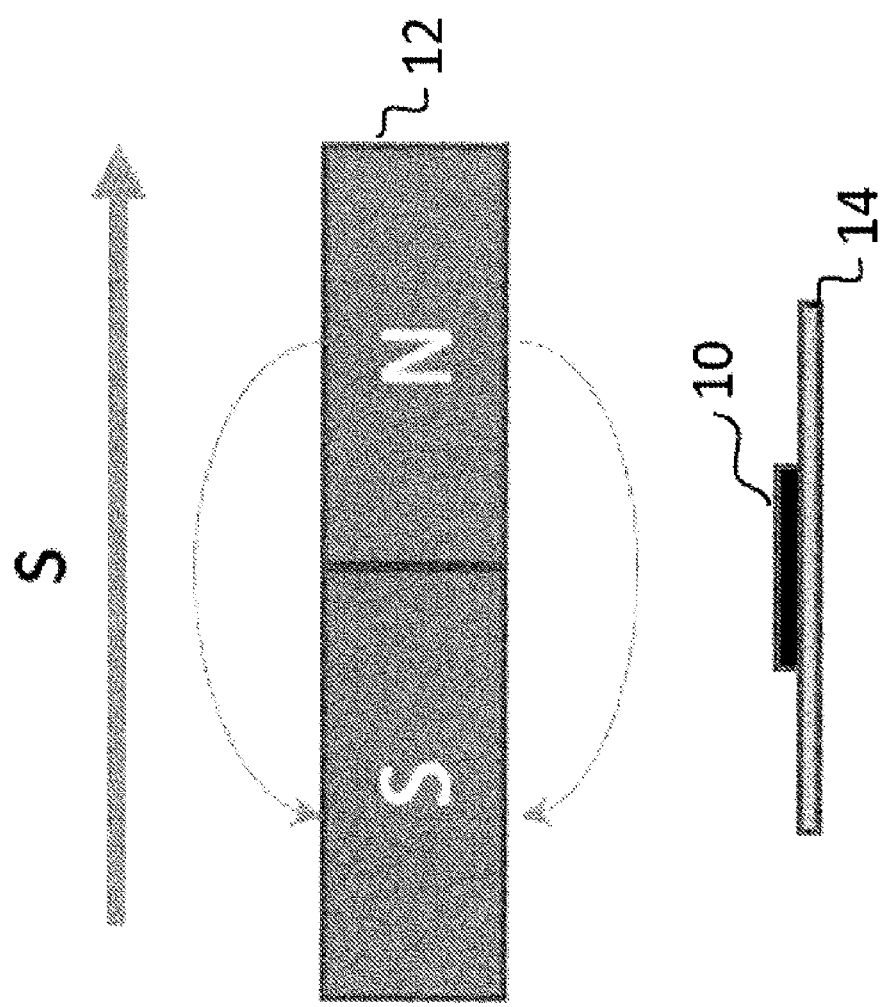

LINEARIZATION OF INPUT SIGNALS

RELATED APPLICATION

This application claims priority to German Patent No. 102019205679.2, filed on Apr. 18, 2019, which is incorporated herein by reference in its entirety.

FIELD

The present disclosure considers the linearization of an input signal using linearization points, which divide a value range into a plurality of intervals. Examples of the present dis-closure relate to a conversion of a sensor output signal, which has nonlinearities at least in part, into a linearized output signal.

BACKGROUND

To capture the value of a physical parameter, for example a temperature, pressure or position, the parameter can be captured by means of a sensor that converts the parameter into an electric magnitude. It may be desirable for the output signal of the sensor to depend linearly on the physical parameter to be captured. However, sensors and measuring arrangements often have output signals with nonlinearities.

By way of example, FIG. 8A shows a magnetic field sensor 10 for capturing a magnetic field generated by a magnet 12. The magnetic field sensor 10 and the magnet 12 can be attached to elements that move relative to one another. By way of example, the magnet 12 can be attached to an element 14 that moves in linear fashion relative to the magnetic field sensor 10, as shown by a movement arrow s in FIG. 8A. By way of example, the magnet 12 can be attached to a pedal that is movable relative to a magnetic field sensor 10 in order to deduce the position of the pedal by capturing the magnetic field; consequently, said sensor represents a position sensor. The magnetic field sensor can capture a relative movement between magnet and magnetic field sensor, with the magnetic field sensor being stationary and the magnet being movable or the magnet being stationary and the magnetic field sensor being movable.

FIG. 8B shows a simulation of the magnetic field Bz generated by the magnet 12. A movement range, within which the position of the magnetic field sensor 10 should be captured, is illustrated about a central position m in FIG. 8B by way of a lower limit g1 and an upper limit g2. The magnetic field sensor 10 is designed to capture the magnetic field Bz. As shown in FIG. 8B, the position is transformed into a linear field change in the region around the central position m. Expressed differently, the magnetic field sensor 10 outputs a linear output signal in this range. FIG. 8B shows that, the position of the magnetic field sensor 10 is transformed into a linear field change in the range of, for example, ±1 mm about the central position m. However, should this range be extended, for example to ±1.5 mm, a nonlinear distortion arises in the ranges between 1 mm and 1.5 mm. FIG. 9 shows a magnification of this region, with a curve K1 depicting the magnetic field captured by the magnetic field sensor 10. Consequently, the output signal of the magnetic field sensor 10 will be nonlinear in the regions where the magnetic field is nonlinear. Curve K2 in FIG. 9 depicts a desired linearized output signal. FIG. 10 shows a sensor measurement error that would arise when using the output signal of the magnetic field sensor 10 without linearization of same.

To achieve linearization, use can be made of linearization points which divide the measurement region into intervals, with the linearization points being uniformly distributed over the measurement region. Here, a resolution of the linearization points can be set in order to obtain a sufficient linearization in nonlinear sections of the measurement region

SUMMARY

Apparatuses and methods for linearizing an input signal, which facilitate a linearization in a flexible manner, would be desirable.

Examples of the present disclosure develop an apparatus for linearizing an input signal, including the following features:

a memory, in which an output value is stored for each of a plurality of linearization points, wherein the linearization points divide a value range into a plurality of intervals, wherein each interval is delimited by a first linearization point with an assigned first output value and a second linearization point with an assigned second output value;

a computer device which is designed to determine the interval in which an input signal value of the input signal is located and to calculate a linearized output signal value for the input signal value by way of a linear interpolation using the input signal value, the first output value of this interval and the second output value of this interval, wherein at least two of the intervals have different interval lengths, which are formed by multiplication of an initial interval length by an integer factor, wherein the factor for at least one of the at least two intervals is not an integer power of an integer base of two or more.

Examples of the present disclosure develop a method for linearizing an input signal, including the following features:

determining the interval of a value range in which an input signal value of the input signal is located, wherein the value range is divided into a plurality of intervals by linearization points, wherein each interval is delimited by a first linearization point with an assigned first output value and a second linearization point with an assigned second output value;

calculating a linearized output signal value for the input signal value by linear interpolation using the input signal value, the first output value of this interval and the second output value of this interval, wherein at least two of the intervals have different interval lengths, which are formed by multiplication of an initial interval length by an integer factor, wherein the factor of at least one of the intervals is not an integer power of an integer base of two or more.

In examples of the disclosure, intervals between linearization points have different interval lengths, and so different resolutions can be achieved in a flexible manner in different sections of a value range, which can also be referred to as measurement range. Consequently, it is possible to use greater intervals in more linear sections of the value range and smaller intervals in more nonlinear sections of the value range. This allows the use of a resolution sufficient for linearization in more nonlinear sections while a lower resolution can be used in other regions. This leads to a reduction in memory requirements since a smaller number of linearization points needs to be stored for the more linear regions than would be required in the case of a uniform interval length. On account of the reduced memory requirements, use can in turn be made of a smaller memory, for example an EEPROM, which may lead to a reduction in the chip area. Examples of the disclosure consequently facilitate a dynamic linearization with a small number of linearization points for applications in which a measurement field has a nonlinear distortion.

BRIEF DESCRIPTION OF THE DRAWINGS

Examples of the disclosure are described below with reference to the attached drawings, in which:

FIG. 7 shows a flowchart of an example of a method according to the present disclosure;

FIG. 8A shows a schematic illustration of an arrangement of a magnet and a magnetic field sensor;

DETAILED DESCRIPTION

Below, examples of the present disclosure are described in detail and using the attached drawings. It should be pointed out that identical elements or elements having the same functionality may be provided with identical or similar reference signs, a repeated description of elements provided with the same or similar reference signs typically being omitted. Descriptions of elements having identical or similar reference signs are mutually interchangeable. In the following description, many details are described in order to yield a more thorough explanation of examples of the disclosure. However, it is evident to those skilled in the art that other examples can be implemented without these specific details. Features of the various examples described can be combined with one another, unless features of a corresponding combination are mutually exclusive or such a combination is expressly excluded.

Figure 1:
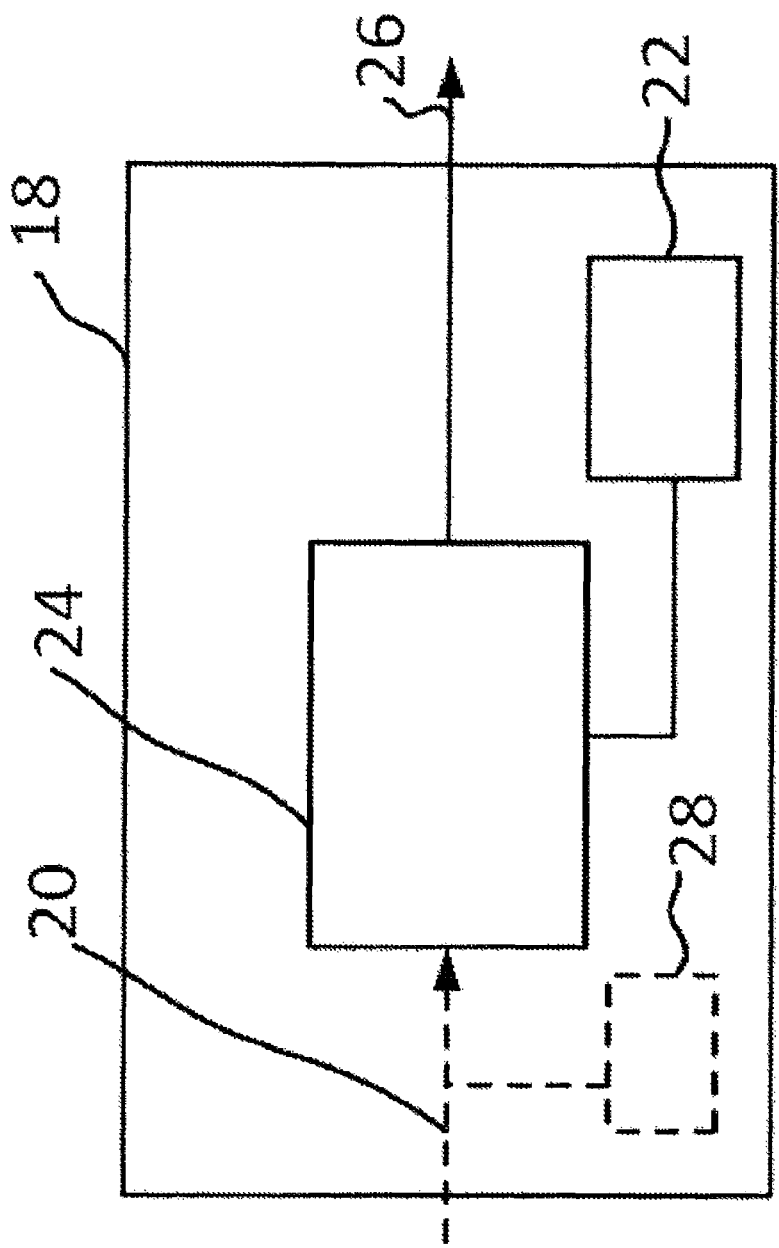
FIG. 1 shows a schematic illustration of an apparatus for linearizing an input signal according to an example of the present disclosure.

FIG. 1 schematically shows an apparatus 18 for linearizing an input signal 20, which has a memory 22 and a computer device 24. The computer device 24 receives the input signal 20 and generates a linearized output signal 26 on the basis thereof. In examples, the computer device 24 can be implemented by any suitable circuit structure, for example microprocessor circuits, ASIC circuits, CMOS circuits and the like. In examples, the computer device can be implemented as a combination of hardware structures and machine-readable commands. By way of example, the processing circuit can comprise a processor and memory devices, which store machine-readable commands that supply the functionalities described and lead to the methods described herein being carried out when executed by the processor. In examples, the memory 22 can be implemented by any suitable memory apparatus, for example EPROM, EEPROM, flash EEPROM, FRAM (ferroelectric RAM), MRAM (magnetoresistive RAM) or phase change RAM. The memory 22 is coupled to the computer device 24 or can be integrated in same as part of the computer device 24. In examples, the computer device 24, the memory 22 and the sensor 28 can be integrated in a sensor module, for example a sensor chip.

The memory 22 stores an output value for each of a plurality of linearization points, wherein the linearization points divide a value range or measurement range into a plurality of intervals, wherein each interval is delimited by a first linearization point with an assigned first output value and a second linearization point with an assigned second output value. The computer device 24 determines from the plurality of intervals the interval in which an input signal value of the input signal is located and calculates a linearized output signal value for the input signal value by way of a linear interpolation using the input signal value, the first output value of this interval and the second output value of this interval. At least two of the intervals have different interval lengths, which are formed by multiplication of an initial interval length by an integer factor, wherein the factor for at least one of the at least two intervals is not an integer power of an integer base of two or more.

Figure 8B:
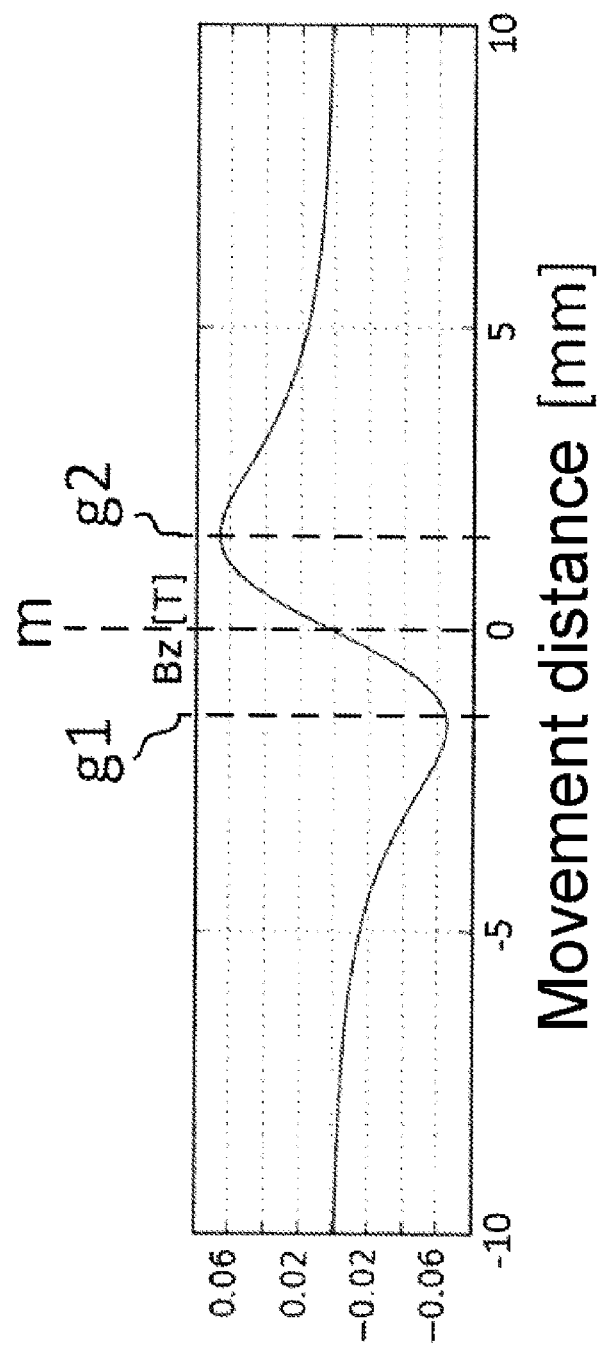
FIG. 8B shows a diagram that shows a magnetic field generated by a magnet over a movement distance.
Figure 9:
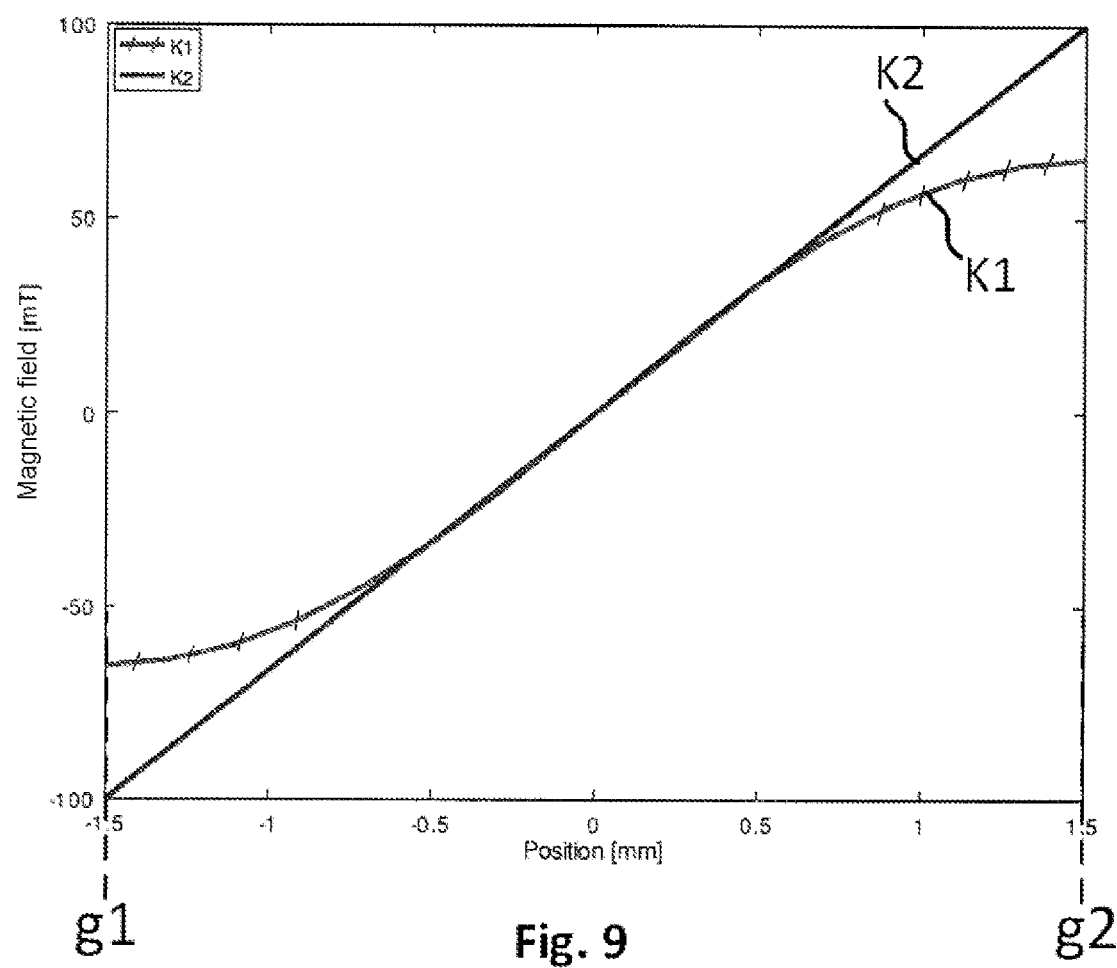
FIG. 9 shows a magnified section of the diagram from FIG. 8B.
Figure 10:
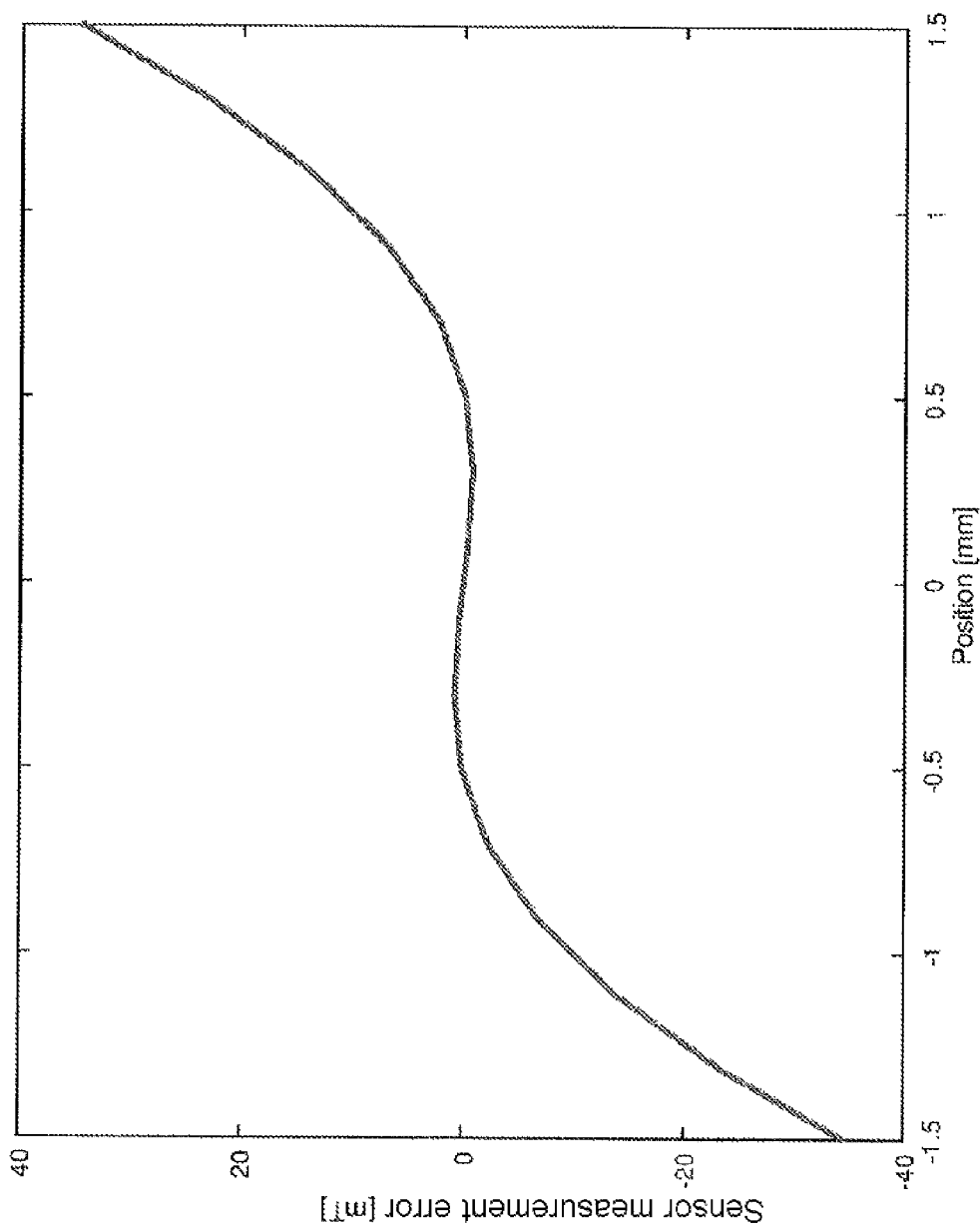
FIG. 10 shows a diagram showing a sensor measurement error.

In examples, the apparatus 18 receives the input signal 20 from an external apparatus, for example a sensor. In other examples, the apparatus 18 can comprise a sensor 28 that supplies the input signal 20, as illustrated in FIG. 1 using dashed lines. Over its value range, the input signal 20 can have linear and nonlinear sections. In examples, the input signal can be an input signal that is based on the magnetic field described above with reference to FIGS. 8-10. In examples, the input signal can be the output signal of the magnetic field sensor 10. In examples, the sensor 28 can be the position sensor 10.

Figure 2:
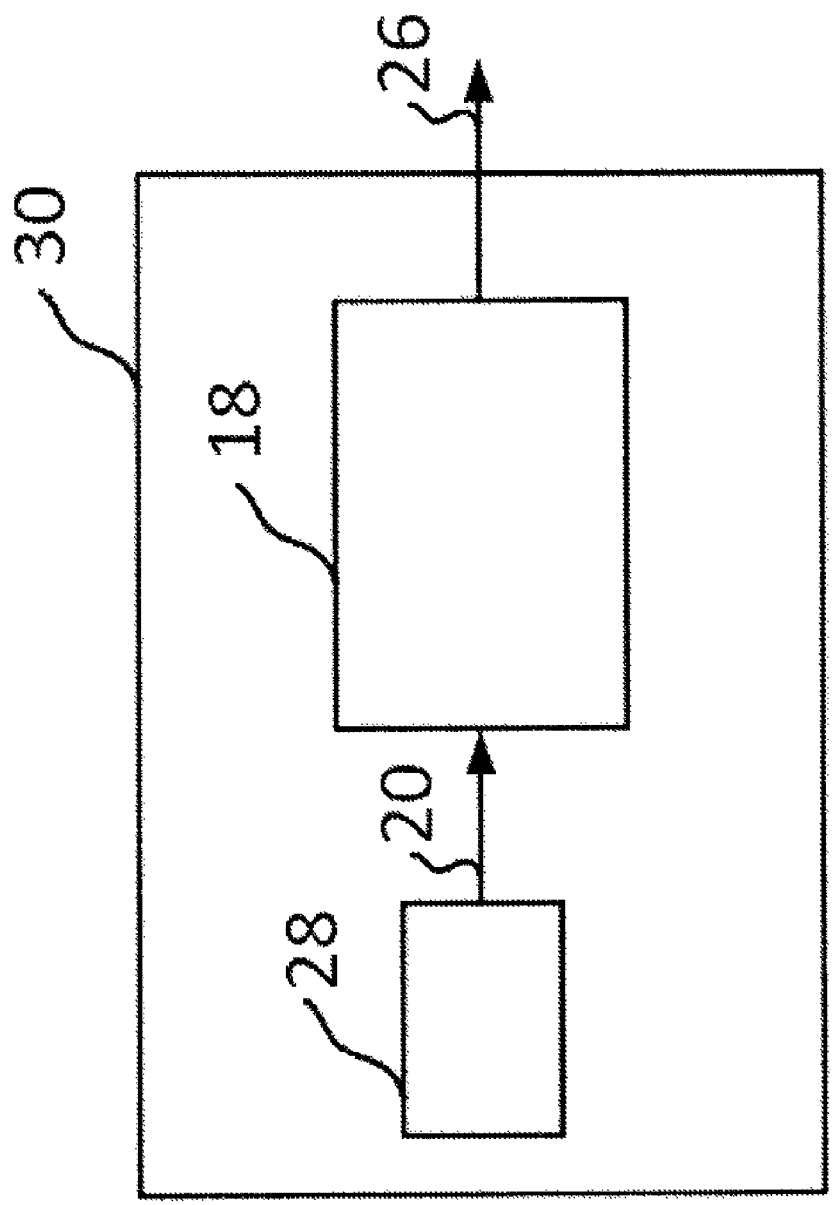
FIG. 2 shows a schematic illustration of a system comprising a position sensor and an apparatus for linearizing an input signal according to an example of the present disclosure.

As shown in FIG. 2, examples of the present disclosure relate to a system that comprises the apparatus 18 for linearizing an input signal and a sensor 28. In such examples, the apparatus 18 can be provided separately from a sensor chip, for example as an external controller.

Figure 3:
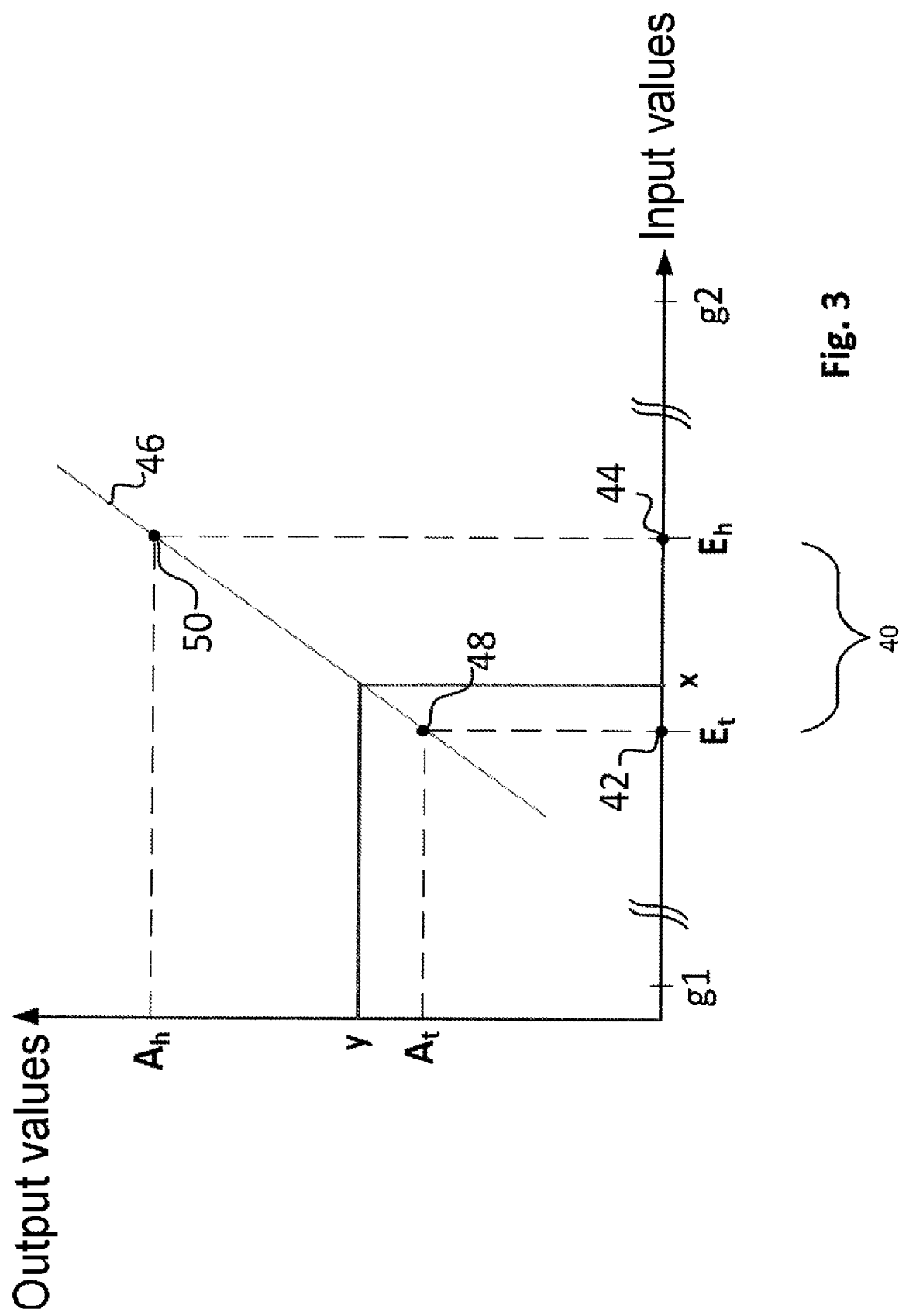
FIG. 3 shows a schematic illustration for explaining the calculation of a linearized output signal value in an interval.

In examples of the present disclosure, a measurement range or value range is divided into intervals by linearization points. An input value and an output value is assigned to each linearization point. FIG. 3 shows an exemplary interval 40, which is delimited by a first linearization point 42 and a second linearization point 44. In FIG. 3, a value range is delimited, in turn, by a lower limit g1 and an upper limit g2. The first linearization point 42 is assigned an input value $E_t$ and an output value $A_t$. The second linearization point 44 is assigned an input value $E_h$ and an output value $A_h$. The input value $E_t$ represents a low value of the interval and the input value $E_h$ represents a high value of the interval. There is linear interpolation within the interval 40 in order to ascertain a linearized output signal value y on the basis of an input signal value x. The linear interpolation is carried out along a straight line 46, which extends through points 48 and 50. The coordinates of the point 48 are determined by the input value and the output value of the first linearization point 42 and the coordinates of the point 50 are determined by the input value and the output value of the second linearization point 44.

The computer device determines the interval in which an input signal value lies and chooses the values assigned to this determined interval for the purposes of calculating the output signal value. In examples, the output values and input values assigned to the linearization points are stored in the memory 22.

In examples of the present disclosure, the linearized output signal value y is calculated using the following calculation principle:

$$y = \frac{(x - E_t) \cdot (A_h - A_t)}{(E_h - E_t)} + A_t \quad (1)$$

Figure 4:
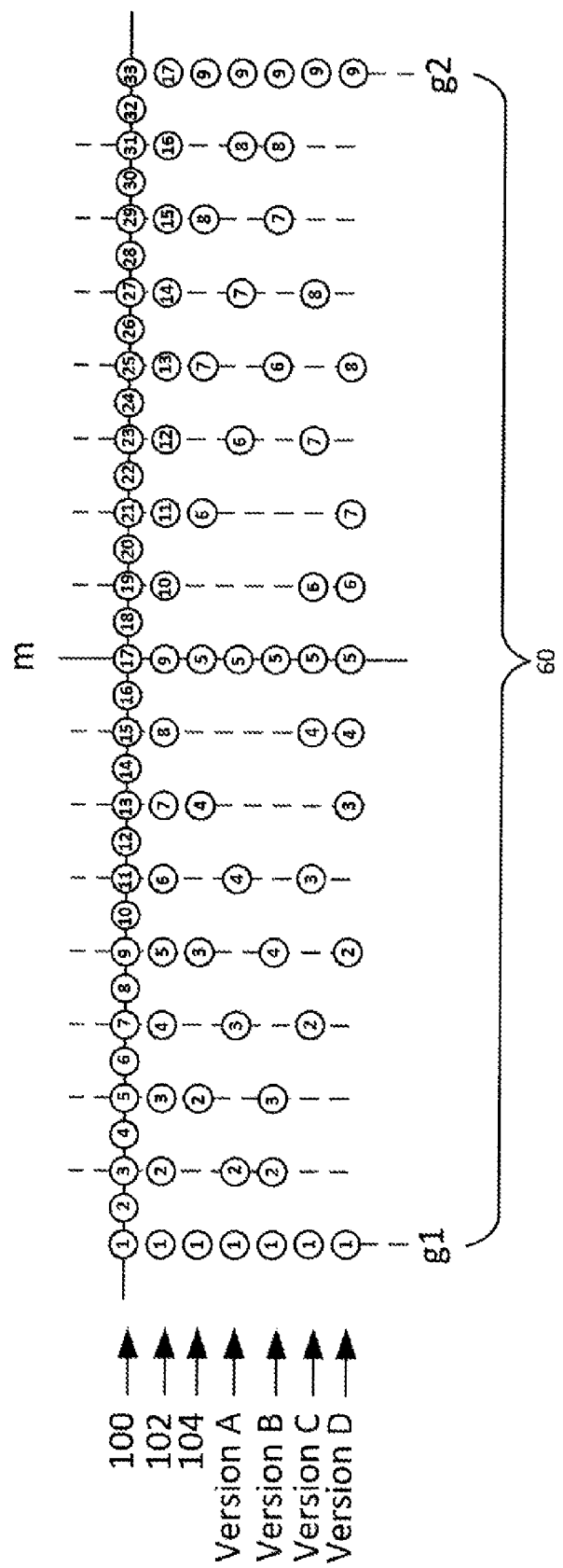
FIG. 4 shows a schematic illustration of different arrangements of linearization points over a value range.

With reference to FIG. 4, there are more detailed explanations below as to how at least two of the intervals have different interval lengths in examples of the present disclosure, which interval lengths are formed by multiplication of an initial interval length by an integer factor, wherein the factor for at least one of the at least two intervals is not an integer power of an integer base of two or more. In the horizontal direction, FIG. 4 shows a value range 60 between a lower limit g1 and an upper limit g2. By way of example, the value range can be the measurement range described above with reference to FIG. 8B. The limits of the value range can each be specified by fixed linearization points, which can be referred to as fixed points. In other examples, the outer linearization points can also be adjustable or programmable; however, in comparison with fixed outer linearization points, this has a greater memory requirement as a consequence.

Various dividing schemes of the value range 60 by linearization points are shown in FIG. 4. A division into thirty-two intervals by equidistant signaling points is shown at 100. A division into sixteen intervals by seventeen equidistant signaling points is shown at 102. A division into eight intervals by nine equidistant signaling points is shown at 104. In each of the schemes 100-104, the intervals each have an interval length of equal size, with the interval length in scheme 102 being twice as long as in scheme 100, and being twice as long in scheme 104 as in scheme 102.

Examples in which the value range 60 is divided into intervals of different length are shown at 106-112 as version A, version B, version C and version D. In versions B and D, the interval lengths are each formed by multiplying an initial interval length by an integer factor, with the factor in each case being an integer power of two. Consequently, the feature that the factor for at least one of the at least two intervals is not an integer power of an integer base of 2 or more is not satisfied in versions B and D.

In versions A and C, at least two of the intervals have different interval lengths, which are formed by multiplication of an initial interval length by an integer factor, wherein the factor for at least one of the at least two intervals is not an integer power of an integer base of two or more.

Here, an initial interval length should be understood to mean an interval length that is obtained by dividing the value range into equidistant intervals. By way of example, the interval length of one of the schemes 100, 102 and 104 can form the initial interval length.

If the interval length of scheme 100 is considered to be the initial interval length, the factor for the interval between the linearization point designated number 3 and the linearization point designated number 4 is four in version A while the factor for the interval between the linearization point designated number 4 and the linearization point designated number 5 is six. If the interval length of scheme 102 is considered to be the initial interval length, the factor for the interval between the linearization point designated number 3 and the linearization point designated number 4 is two in version A while the factor for the interval between the linearization point designated number 4 and the linearization point designated number 5 is three.

If the interval length of scheme 100 is considered to be the initial interval length, the factor for the interval between the linearization point designated number 1 and the linearization point designated number 2 is six in version C while the factor for the interval between the linearization point designated number 2 and the linearization point designated number 3 is four. If the interval length of scheme 102 is considered to be the initial interval length, the factor for the interval between the linearization point designated number 1 and the linearization point designated number 2 is three in version C while the factor for the interval between the linearization point designated number 2 and the linearization point designated number 3 is two.

The interval lengths of the remaining intervals for the shown example can readily be gathered from FIG. 4.

Consequently, a fixed scheme or grid of positions is used in examples of the disclosure, specifically the scheme that is formed by the equidistant positions which are spaced from one another by the initial interval length. Examples of such schemes are shown at 100, 102 and 104 in FIG. 4. By way of a selection, the linearization points can be assigned dynamically to these set positions in order to obtain different resolutions of signaling points in different sections of the value range. Thus, a shorter interval length can be used in a section of the value range in which the input signal is less linear while a longer interval length can be used in a section of the value range in which the input signal is more linear. Consequently, it is possible to assign a higher resolution to the signaling where it is expedient in order to obtain a sufficient linearization. At the same time, a longer such interval length can be used where a linearization with a longer interval length is sufficient in order to save memory.

Of the examples shown in FIG. 4, version A, for example, may be suitable for an input signal as described above with reference to FIG. 8B since, as a result thereof, a higher resolution is obtained in the edge sections of the value range, in which the input signal is less linear, than in a central region of same.

By way of example, the scheme according to version C in FIG. 4 can be used for input signals which are less linear in a central section of the value range and which are more linear in an outer section of the value range. It is self-evident to persons skilled in the art that the specified schemes are purely exemplary, with the interval lengths being able to be set differently in real life on the basis of the linearity of the input signal over the value range. In examples, the plurality of intervals can be arranged symmetrically with respect to a center of the value range.

In examples, various schemes of dividing the value range by linearization points can be set and/or stored in advance, for example versions A and C shown in FIG. 4. Then, one of these schemes can be selected, for example depending on at least one configuration bit that represents selection information. As a result, it is possible to select a suitable scheme in a simple fashion for a certain input signal.

Consequently, according to examples of the present disclosure, a small number of intervals, for example eight intervals, allows a higher resolution to be obtained in sections of lower linearity than can be obtained using eight intervals formed by equidistant linearization points. Further, the interval lengths can be set flexibly because the interval lengths are not restricted to those formed by multiplying an initial interval length by an integer factor, where the factor is an integer power of two. This facilitates flexible adaptation to nonlinearities over the value range of an input signal.

Consequently, in examples of the present disclosure, the implementation differs from a completely flexibly programmable linearization characteristic. Firstly, a completely flexibly programmable linearization characteristic would require much memory and, secondly, would require increased computational outlay in order to calculate respective interpolations during the linearization. Examples of the present disclosure allow implementation of a linearization scheme with little complexity, for example using only nine linearization points. In examples, the linearization points can be selected and set in such a way that an efficient implementation is possible, at least for some of the intervals, since the division to be performed during the interpolation can be implemented by a digital shift operation.

For input signals that have sections of different linearity in a value range, the procedure disclosed herein renders it possible to reduce the overall linearization error in comparison with a case where equidistant linearization points are used. In this case, examples of the present disclosure allow the linear behavior, in particular, to be re-established, especially in regions with little linearity. In examples of the disclosure, this is achieved without a completely flexibly programmable linearization; instead, this is achieved using a small number of linearization points that are arranged at positions of an underlying regular grid, which, firstly, can reduce memory requirements and, secondly, can simplify the calculation.

In examples, the interval length of at least one interval of the plurality of intervals corresponds to an integer power of two, wherein, for this interval, the computer device can implement a division by the interval length, to be performed during the linear interpolation, by means of a digital shift operation. As a result, it is possible to implement the linearization with reduced computational outlay. In examples, intervals whose interval length does not correspond to an integer power of two can be divided into partial intervals, the length of which corresponds to an integer power of two such that, for these partial intervals, the division to be performed during the interpolation can be implemented by means of a digital shift operation.

In examples, the input values assigned to the linearization points are fixed values of the value range in accordance with the division scheme. Expressed differently, the value range is divided into a grid of grid positions, wherein a distance between two grid points in each case corresponds to the initial interval length and wherein each linearization point is arranged at an assigned grid position. Consequently, it is possible to store in the memory 22 not the input value assigned to a linearization point but information in respect of the grid position assigned to the linearization point, from which the input value can readily be calculated. Consequently, it is possible to store this information with little memory requirements.

The output values assigned to the linearization points are set, e.g., programmed, in order to obtain the desired linearization of the input signal. By way of example, the output values can be set or programmed during a calibration measurement.

As explained above, the compensated output value can be calculated according to equation (1) in examples. In an example where 12 bits are available for the respective values, an input value range can be 0-4095. Then, in the case of an equidistant linearization, the assigned input values of nine linearization points can have the values of 0, 511, 1023, 1535, 2047, 2559, 3071, 3583 and 4095. Then, the division in equation (1) can be implemented by shifting nine bits for all intervals. In examples of the present disclosure, this can be implemented for those intervals or segments whose length corresponds to an integer power of two.

By way of example, if version A, above, which likewise has a word length of 12 bits for the respective values is now considered, the input value range is likewise from 0-4095, with the input values assigned to the nine linearization points being 0, 255, 767, 1279, 2047, 2815, 3327, 3839 and 4095. Then, the interval lengths are $2^8$ for the first interval, $2^9$ for the second interval, $2^9$ for the third interval, $2^8+2^9$ for the fourth interval, $2^8+2^9$ for the fifth interval, $2^9$ for the sixth interval, $2^9$ for the seventh interval and $2^8$ for the eighth interval. Then, an input signal value x of 760 is located in the second interval, which has an interval length of $2^9$, and so the division in equation (1) can be implemented as a shift operation. Then, an input signal value x of 1520 is located in the fourth interval, the interval length of which is $2^8+2^9$, and so the division is no longer possible as a pure shift operation.

In order to facilitate a simpler calculation even in the case of intervals whose interval length does not correspond to an integer power of two, the calculation can be carried out as set forth below in examples of the present disclosure. If the interval length corresponds to the sum of two different integer powers of two, the interval can be divided into partial intervals by auxiliary linearization points, the partial interval length of which partial intervals corresponds to the smaller one of the two integer powers of two, wherein an auxiliary linearization point initial value is calculated for each auxiliary linearization point. The partial interval in which the input signal value of the input signal is located is determined. A linearized output signal value is calculated by linear interpolation in the partial interval in which the input signal is located and a division by the partial interval length, to be performed during the linear interpolation, is implemented by means of a digital shift operation.

Figure 5:
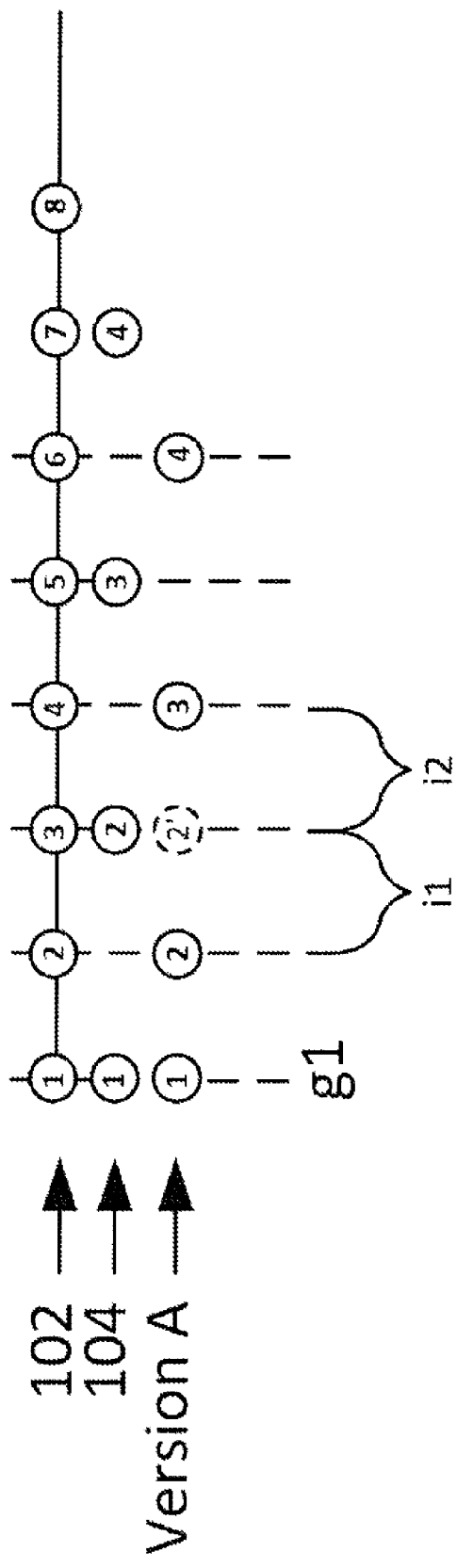
FIG. 5 and FIG. 6 show schematic illustrations for explaining the use of auxiliary linearization points according to examples of the present disclosure.

Examples for such a procedure are now explained with reference to FIGS. 5 and 6. Here, FIG. 5 shows the first eight positions of an equidistant linearization scheme with sixteen points at 102, the first four positions of an equidistant linearization scheme with eight points at 104 and the first four linearization points of the linearization scheme according to version A. Here, in order to be able to use a constant shift when calculating the division in equation (1), specifically by $2^8$, for example, a virtual output value can be calculated for a point 2', which represents a virtual point or auxiliary linearization point:

$$A_{h2'} = \frac{A_h - A_t}{2} \qquad (2)$$

Then, the linearized output value can be calculated by virtue of the value $A_h$ being replaced in equation (1) by the value $A_{h2}$, if the input signal value is located in the partial interval i1 and by virtue of the value $A_t$ being replaced in equation (1) by the value $A_{h2}$, if the input signal value is located in the partial interval i2.

Such a procedure can be used to be able to use a constant shift in examples in which different interval lengths are formed by multiplying an initial interval length by an integer factor that is an integer power of two for calculating the division in equation (1) for the intervals with said interval lengths.

Figure 6:
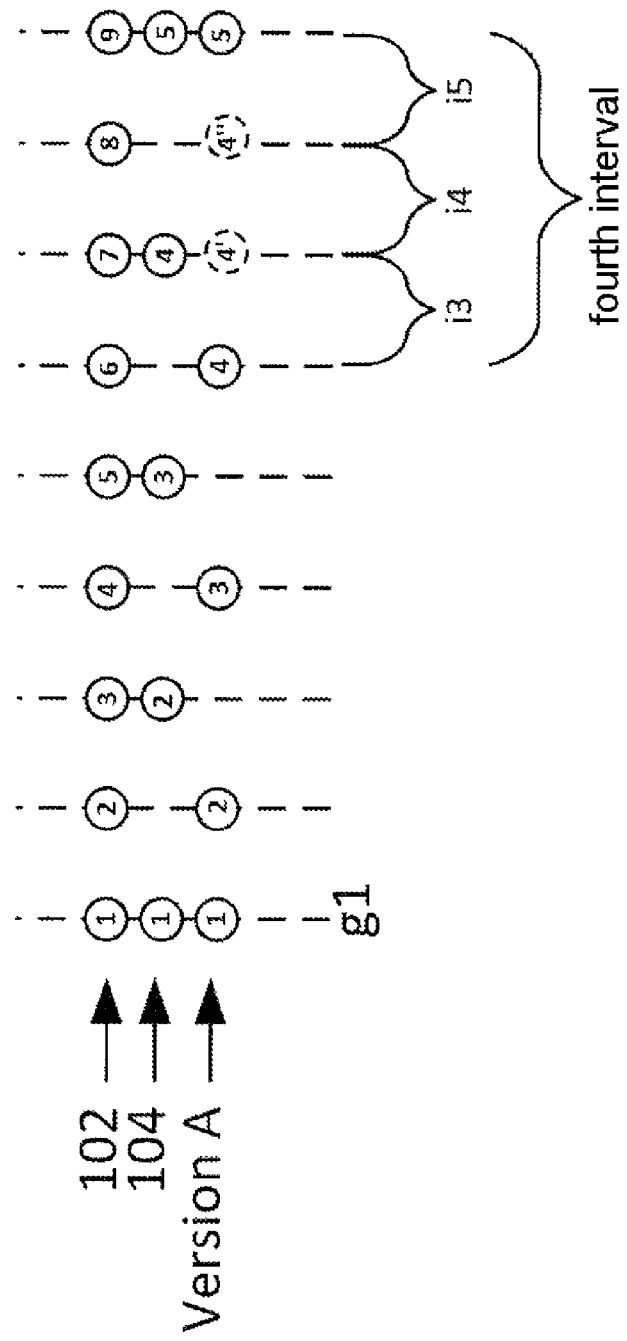

If the fourth interval of the linearization scheme according to version A, as shown in FIG. 6, is now considered, it is possible to determine two virtual points 4' and 4" at positions 7 and 8 of the equidistant scheme 102 in order to divide the interval into three partial intervals and it is possible to calculate virtual output values for these points as set forth below.

$$A_{h4'} = \frac{A_h - A_t}{3} \quad (3)$$

$$A_{h4''} = \frac{2(A_h - A_t)}{3} \quad (4)$$

Then, these virtual output values can be used as set forth below in the calculation of the linearized output value. If the input signal value is located in partial interval i3, the value $A_h$ in equation (1) is replaced by the value $A_{h4'}$. If the input signal value is located in partial interval i4, the value $A_t$ is replaced by the value $A_{h4'}$ and the value $A_h$ is replaced by the value $A_{h4''}$ in equation (1). If the input signal value is located in partial interval i5, the value $A_t$ in equation (1) is replaced by the value $A_{h4''}$. Consequently, in this case too, the division in equation (1) can be implemented by a shift operation since the auxiliary linearization points are chosen in such a way that the interval length of the partial intervals corresponds to an integer power of two.

In examples of the present disclosure, the input values assigned to the linearization points can be stored internally for the purposes of calculating the linear interpolation. This lends itself, in particular, to a small number of linearization points. In order to reduce the memory requirements in the case of a greater number of linearization points, it is possible to only store the position of the linearization points in an equidistant grid in other examples, wherein the distance between the grid points corresponds to the initial interval length. Then, the respectively assigned value can be calculated according to the calculations above for the partial intervals. Here, the position of the linearization points can be chosen on the basis of the linearization problem.

An example of respective values when using the 16 bits for the input value range are specified in the following table for versions A to D above and an equidistant linearization scheme.

|  | P1 | P2 | P3 | P4 | P5 | P6 | P7 | P8 | P9 |
|---|---|---|---|---|---|---|---|---|---|
| Equidistant | 0 | 8192 | 16384 | 24579 | 32768 | 40960 | 49152 | 57344 | 65535 |
| Version A | 0 | 4096 | 12288 | 20480 | 32768 | 45056 | 53248 | 61440 | 65535 |
| Version B | 0 | 4096 | 8192 | 16384 | 32768 | 49152 | 57344 | 61440 | 65535 |
| Version C | 0 | 12288 | 20480 | 28672 | 32768 | 36864 | 45056 | 53248 | 65535 |
| Version D | 0 | 16384 | 24576 | 28672 | 32768 | 36864 | 40960 | 49152 | 65535 |

Even though examples with schemes of a certain number of linearization points in a grid with a certain number of intervals are described herein, e.g., nine linearization points in a grid of sixteen intervals, it is self-evident that the teaching described herein is also applicable to other schemes in which a different number of linearization points are selected in a grid with a different number of intervals, such as, e.g., nine or seventeen linearization points in a grid of 32, 64, 128 or an even greater number of intervals.

Consequently, examples of the present disclosure facilitate an implementation of a linearization scheme which may have a reduced memory requirement in relation to a completely flexible approach since it is not necessary to store all input values of the linearization points but only the position of same in a given grid. Further, examples facilitate a lower calculation outlay since a division to be calculated in the case of the linear interpolation can be implemented by a shift operation. Here, the number of bits for the shift operation may be variable, depending on the respective interval length or partial interval length. The number of linearization points in examples of the present disclosure can be reduced in relation to an equidistant solution approach since a longer interval length can be used where the input signal has a lower nonlinearity.

In examples, the apparatus can be implemented in a controller, for example an ECU (electric control unit) of a motor vehicle on a system level, which receives the output signal of a sensor module as an input signal. However, in order to facilitate a simple replacement, provision would have to be made of a calibrated sensor module in that case. Therefore, the apparatus is provided integrated in a sensor module in examples such that the sensor module already outputs a linearized output signal, which can be supplied to a controller and can be processed there.

An example of a method for linearizing an input signal is shown in FIG. 7. The interval of a value range in which an input signal value of the input signal is located is determined at 200, wherein the value range is divided into a plurality of intervals by linearization points, and each interval is delimited by a first linearization point with an assigned first output value and a second linearization point with an assigned second output value. At least two of the intervals have different interval lengths, which are formed by multiplication of an initial interval length by an integer factor, wherein the factor of at least one of the intervals is not an integer power of an integer base of two or more. A linearized output signal value for the input signal value is calculated at 202 by linear interpolation using the input signal value, the first output value of this interval and the second output value of this interval.

Consequently, examples of the present disclosure create a linearization of a measurement problem, for example for a pedal position measurement, using predefined schemes, for example the versions A to D, specified above, with a small number of programmable linearization points, in order to obtain a better system behavior in the form of a smaller position error. In examples, the apparatus can be designed to allow a scheme to be selected from a number of predefined schemes, for example using one or more configuration bits.

Depending on certain implementation requirements, examples of the present disclosure can be implemented by any combination of circuits, hardware and/or machine-readable commands. Examples of the apparatus described herein can comprise a central processing unit, CPU, a microprocessor and/or any hardware apparatus that is suitable for executing commands that are stored on a machine-readable medium. Examples of the apparatus can comprise a machine-readable medium, which stores machine-readable commands that bring about the functionalities described herein when they are executed by a processing device. The machine-readable medium can be implemented by any electronic, magnetic, optical or other physical storage medium, for example EPROM, EEPROM, flash EEPROM, FRAM (ferroelectric RAM), MRAIVI (magnetoresistive RAM) or phase change RAM. Examples of the present disclosure relate to machine-readable commands which, when executed by a processing device, cause the processing device to bring about the functionalities as described herein.

Even though some aspects of the present disclosure have been described as features in conjunction with an apparatus, it is evident that such a description can likewise be considered to be a description of corresponding method features. Even though some aspects have been described as features in conjunction with a method, it is evident that such a description can also be considered to be a description of corresponding features of an apparatus or of the functionality of an apparatus.

The disclosure above provides illustrations and descriptions; however, it is not intended to be exhaustive or restrict the implementations to the disclosed precise form. Modifications and variations are possible in light of the above disclosure or can be obtained from practice of the implementations. Even though certain combinations of features are cited in the patent claims and/or disclosed in the description, these features are not intended to limit the disclosure of possible implementations. In fact, many of these features may be combined in ways not specifically cited in the patent claims and/or disclosed in the description. Although each of the dependent patent claims cited below may directly depend only on one patent claim or some patent claims, the disclosure of possible implementations includes each dependent patent claim in combination with all other patent claims in the set of patent claims.

The examples described above merely illustrate the principles of the present disclosure. It should be understood that modifications and variations of the arrangements and of the details which are described are obvious to those skilled in the art. Therefore, the disclosure is intended to be limited only by the appended patent claims and not by the specific details which are presented for the purpose of describing and explaining the examples.

LIST OF REFERENCE SIGNS

10 Magnetic field sensor
12 Magnet
14 Element
18 Apparatus for linearization
20 Input signal
22 Memory
24 Computer device
26 Linearized output signal
28 Sensor
30 System
40 Interval
42 First linearization point
44 Second linearization point
46 Straight line
48, 50 Points
60 Value range
100 Equidistant distribution, 32 intervals
102 Equidistant distribution, 16 intervals
104 Equidistant distribution, 8 intervals
g1 Lower limit
g2 Upper limit

What is claimed is:

1. A system for linearizing a sensor signal by converting the sensor signal into a linearized output signal, comprising:
a position sensor comprising a magnetic field sensing element configured to measure a magnetic field representative of a position of an object whose position changes relative to the position sensor, wherein the position sensor is configured to generate the sensor signal based on the measured magnetic field, wherein the magnetic field undergoes a linear field change corresponding to a first range of motion of the object relative to the position sensor and undergoes a non-linear field change corresponding to a second range of motion of the object relative to the position sensor;
a memory, in which an output value is stored for each of a plurality of linearization points, wherein the plurality of linearization points divide a value range into a plurality of intervals, wherein each interval is delimited by a respective first linearization point with an assigned respective first output value and a respective second linearization point with an assigned respective second output value,
wherein at least two intervals of the plurality of intervals have different interval lengths, which are formed by multiplication of an initial interval length by a respective integer factor, wherein the respective integer factor for at least one of the at least two intervals is not an integer power of an integer base of two or more; and
a processing circuit configured to receive the sensor signal comprising a plurality of sensor signal values and convert the sensor signal into the linearized output signal comprising a plurality of linearized output values, wherein the processing circuit is configured to determine an interval of the plurality of intervals in which a sensor signal value of the sensor signal is located based on the sensor signal value and to calculate a linearized output signal value for the sensor signal value by way of a linear interpolation using the sensor signal value, the assigned respective first output value of the determined interval, and the assigned respective second output value of the determined interval,
wherein the processing circuit is configured to convert the sensor signal value into the calculated linearized output signal value and generate the linearized output signal comprising the calculated linearized output signal value, and
wherein the linearized output signal is substantially free of non-linear distortion and represents the position of the object as the position changes within the first range of motion and the second range of motion of the object relative to the position sensor.

2. The system as claimed in claim 1, wherein the plurality of intervals are arranged symmetrically with respect to a center of the value range.

3. The system as claimed in claim 1, wherein the processing circuit is configured to calculate the linearized output signal value, denoted by y, using the following calculation principle:

$$y = \frac{(x - E_t) \cdot (A_h - A_t)}{(E_h - E_t)} + A_t$$

where x is the sensor signal value, $E_t$ is an input value assigned to the respective first linearization point of the determined interval, $E_h$ is an input value assigned to the respective second linearization point of the determined interval, $A_t$ is the assigned respective first output value of the respective first linearization point of the determined interval, and $A_h$ is the assigned respective second output value of the respective second linearization point of the determined interval.

4. The system as claimed in claim 1, wherein:
an interval length of at least one interval of the plurality of intervals corresponds to an integer power of two, and
the processing circuit is configured to implement, for the at least one interval, a division by the interval length, to be performed during the linear interpolation, by a digital shift operation.

5. The system as claimed in claim 1, wherein:
an interval length of at least one interval corresponds to a sum of two different integer powers of two, and
for the at least one interval, the processing circuit is configured to:
  divide the at least one interval into partial intervals by way of auxiliary linearization points, a partial interval length of each of the partial intervals corresponds to a smaller one of the two different integer powers of two, wherein an auxiliary linearization point initial value is calculated for each auxiliary linearization point;
  determine a partial interval of the partial intervals in which the sensor signal value of the sensor signal is located; and
  calculate the linearized output signal value by linear interpolation in the partial interval in which the sensor signal value is located and to implement a division by the partial interval length, to be performed during the linear interpolation, by a digital shift operation.

6. The system as claimed in claim 1, wherein the value range is divided into a grid of grid positions, wherein a distance between two grid positions in each case corresponds to the initial interval length and wherein each linearization point is arranged at an assigned grid position.

7. The system as claimed in claim 6, wherein the assigned grid position is stored in the memory for each linearization point.

8. The system as claimed in claim 1, wherein an assigned input value is stored in the memory for each linearization point.

9. The system as claimed in claim 1, wherein interval lengths in a first section of the value range, in which a linearity of the sensor signal is smaller than in a second section of the value range, are shorter than interval lengths in the second section of the value range.

10. The system as claimed in claim 1, wherein the processing circuit is configured to select a distribution of a plurality of different distributions of linearization points over the value range on a basis of selection information and to use the selected distribution when calculating the linearized output signal value.

11. A method for converting a sensor signal into a linearized output signal, the method comprising:
  measuring, by a position sensor, a magnetic field representative of a position of an object whose position changes relative to the position sensor, wherein the magnetic field undergoes a linear field change corresponding to a first range of motion of the object relative to the position sensor and undergoes a non-linear field change corresponding to a second range of motion of the object relative to the position sensor;
  generating, by the position sensor, the sensor signal comprising a plurality of sensor signal values based on the measured magnetic field;
  converting, by a processing circuit, the sensor signal into the linearized output signal comprising a plurality of linearized output values, wherein converting the sensor signal comprises:
    determining an interval of a value range in which a sensor signal value of the sensor signal is located based on the sensor signal value, wherein the value range is divided into a plurality of intervals by linearization points, wherein each interval is delimited by a respective first linearization point with an assigned respective first output value and a respective second linearization point with an assigned respective second output value;
    calculating a linearized output signal value for the sensor signal value by linear interpolation using the sensor signal value, the assigned respective first output value of the determined interval, and the assigned respective second output value of the determined interval;
    converting the sensor signal value into the calculated linearized output signal value; and
    generating the linearized output signal comprising the calculated linearized output signal value,
    wherein the linearized output signal is substantially free of non-linear distortion and represents the position of the object as the position changes within the first range of motion and the second range of motion of the object relative to the position sensor, and
  wherein at least two intervals of the plurality of intervals have different interval lengths, which are formed by multiplication of an initial interval length by a respective integer factor, wherein the respective integer factor of at least one of the intervals is not an integer power of an integer base of two or more.

12. The method as claimed in claim 11, wherein the plurality of intervals are arranged symmetrically with respect to a center of the value range.

13. The method as claimed in claim 11, wherein the linearized output signal value, denoted by y, is calculated using the following calculation principle:

$$y = \frac{(x - E_t) \cdot (A_h - A_t)}{(E_h - E_t)} + A_t$$

where x is the sensor signal value, $E_t$ is an input value assigned to the respective first linearization point of the determined interval, $E_h$ is an input value assigned to the respective second linearization point of the determined interval, $A_t$ is the assigned respective first output value of the respective first linearization point of the determined interval, and $A_h$ is the assigned respective second output value of the respective second linearization point of the determined interval.

14. The method as claimed in claim 11, wherein:
an interval length of at least one interval of the plurality of intervals corresponds to an integer power of two, and wherein, for the at least one interval, a division by the interval length, to be performed during the linear interpolation, is implemented by a digital shift operation.

15. The method as claimed in claim 11, wherein:
an interval length of at least one interval corresponds to a sum of two different integer powers of two, wherein the method further comprises:
  dividing the at least one interval into partial intervals by way of auxiliary linearization points, a partial interval length of each of the partial intervals corresponds to a smaller one of the two different integer powers of two, wherein an auxiliary linearization point initial value is calculated for each auxiliary linearization point;
  determining a partial interval of the partial intervals in which the sensor signal value of the sensor signal is located; and
  calculating the linearized output signal value by linear interpolation in the partial interval in which the sensor signal value is located, wherein a division by the partial interval length, to be performed during the linear interpolation, is implemented by a digital shift operation.

16. The method as claimed in claim 11, wherein the value range is divided into a grid of grid positions, wherein a distance between two grid positions in each case corresponds to the initial interval length and wherein each linearization point is arranged at an assigned grid position.

17. The method as claimed in claim 11, wherein interval lengths in a first section of the value range, in which a linearity of the sensor signal is smaller than in a second section of the value range, are shorter than interval lengths in the second section of the value range.

18. The method as claimed in claim 11, further comprising:
   selecting a distribution of linearization points of a plurality of different distributions of linearization points over the value range on a basis of selection information, wherein the selected distribution of linearization points is used when calculating the linearized output signal value.

19. A non-transitory computer-readable medium configured to store machine-readable commands which, when executed by a processing device, cause the processing device to carry out the method as claimed in claim 11.

20. The system as claimed in claim 1, wherein the processing circuit is configured to convert each of the plurality of sensor signal values into a respective one of the plurality of linearized output values on an individual basis by determining a respective interval of the plurality of intervals in which a respective sensor signal value is located and to calculate a respective linearized output signal value for the respective sensor signal value by way of a linear interpolation using the respective sensor signal value, the assigned respective first output value of the determined interval, and the assigned respective second output value of the determined interval,
   wherein the processing circuit is configured to generate the linearized output signal comprising the calculated linearized output signal values.

* * * * *